United States Patent
Berner et al.

(10) Patent No.: US 9,920,245 B2
(45) Date of Patent: Mar. 20, 2018

(54) WATCH COMPONENTS

(71) Applicant: Rolex S.A., Genève (CH)

(72) Inventors: Detlef Berner, La Conversion (CH);
Romain Girod, Annemasse (FR);
Ollivier Pujol, Lausanne (CH); Isabelle Rigot, La Belme de Sillingy (FR)

(73) Assignee: Rolex SA, Genève (CH)

( * ) Notice: Subject to any disclaimer, the term of this patent is extended or adjusted under 35 U.S.C. 154(b) by 237 days.

(21) Appl. No.: 14/438,637

(22) PCT Filed: Nov. 7, 2013

(86) PCT No.: PCT/EP2013/073248
§ 371 (c)(1),
(2) Date: Apr. 27, 2015

(87) PCT Pub. No.: WO2014/072388
PCT Pub. Date: May 15, 2014

(65) Prior Publication Data
US 2015/0252260 A1   Sep. 10, 2015

(30) Foreign Application Priority Data
Nov. 7, 2012  (FR) .................................. 12 191561

(51) Int. Cl.
*C09K 11/77* (2006.01)
*C04B 35/48* (2006.01)
*C09K 11/02* (2006.01)
*C04B 35/44* (2006.01)
*C04B 35/488* (2006.01)
*C04B 35/634* (2006.01)

(52) U.S. Cl.
CPC .......... *C09K 11/7792* (2013.01); *C04B 35/44* (2013.01); *C04B 35/48* (2013.01); *C04B 35/481* (2013.01); *C04B 35/488* (2013.01); *C04B 35/4885* (2013.01); *C04B 35/634* (2013.01); *C09K 11/025* (2013.01); *C04B 2235/3206* (2013.01); *C04B 2235/3208* (2013.01); *C04B 2235/3213* (2013.01); *C04B 2235/3215* (2013.01); *C04B 2235/3222* (2013.01); *C04B 2235/3224* (2013.01); *C04B 2235/3225* (2013.01); *C04B 2235/3227* (2013.01); *C04B 2235/3229* (2013.01); *C04B 2235/3246* (2013.01); *C04B 2235/3436* (2013.01); *C04B 2235/3445* (2013.01); *C04B 2235/3454* (2013.01); *C04B 2235/3481* (2013.01); *C04B 2235/5436* (2013.01); *C04B 2235/5463* (2013.01); *C04B 2235/6567* (2013.01); *C04B 2235/6582* (2013.01); *C04B 2235/661* (2013.01); *C04B 2235/664* (2013.01); *C04B 2235/765* (2013.01); *C04B 2235/77* (2013.01); *C04B 2235/80* (2013.01); *C04B 2235/96* (2013.01); *C04B 2235/9661* (2013.01); *Y10T 428/24917* (2015.01); *Y10T 428/24926* (2015.01)

(58) Field of Classification Search
CPC ... C09K 11/02; C09K 11/7792; C09K 11/025; C04B 35/01; C04B 35/44; C04B 35/488; C04B 2235/6582; C04B 2235/664; C04B 2235/661; C04B 2235/80; C04B 2235/9646; C04B 35/48; C04B 35/481; C04B 35/4885; C04B 35/634; Y10T 428/24917; Y10T 428/24926
See application file for complete search history.

(56) References Cited

U.S. PATENT DOCUMENTS

| | | | |
|---|---|---|---|
| 4,403,014 A * | 9/1983 | Bergmann | A44C 27/006 428/546 |
| 6,010,644 A * | 1/2000 | Fu | C03C 4/12 252/301.4 R |
| 7,121,717 B2 | 10/2006 | Grippo et al. | |
| 8,993,466 B2 * | 3/2015 | Pujol | C04B 35/111 501/127 |
| 9,284,485 B2 * | 3/2016 | Berner | C04B 35/44 |
| 9,394,480 B2 * | 7/2016 | Berner | C09K 11/7792 |
| 9,434,654 B2 * | 9/2016 | Pujol | G04B 37/226 |
| 2010/0142181 A1 | 6/2010 | Schmidt et al. | |
| 2013/0072373 A1 * | 3/2013 | Pujol | C04B 35/111 501/135 |
| 2013/0207040 A1 * | 8/2013 | Berner | C09K 11/7792 252/301.4 R |
| 2015/0252260 A1 * | 9/2015 | Berner | C09K 11/7792 428/209 |
| 2015/0307406 A1 * | 10/2015 | Pujol | G04B 37/226 368/280 |
| 2016/0137919 A1 * | 5/2016 | Berner | C04B 35/44 252/301.4 R |

FOREIGN PATENT DOCUMENTS

JP   2004-292588     10/2004
JP   2004292588 A  * 10/2004

OTHER PUBLICATIONS

Machine Translation of JP2004292588 (2004).*

(Continued)

*Primary Examiner* — Alexander R Pagano
(74) *Attorney, Agent, or Firm* — Rankin, Hill & Clark LLP

(57) ABSTRACT

Watch component made of a persistent phosphorescent ceramic composite material which is a sintered dense body comprising two or more phases, a first phase consisting of at least one metal oxide and a second phase consisting of a metal oxide containing at least one activating element in a reduced oxidation state, the watch component having a surface which comprises an area which shows phosphorescent emission and an area which does not show phosphorescent emission or which shows phosphorescent emission with an intensity which is lower than that of the emission of the other area.

20 Claims, 4 Drawing Sheets

(56) References Cited

OTHER PUBLICATIONS

Figure 1:
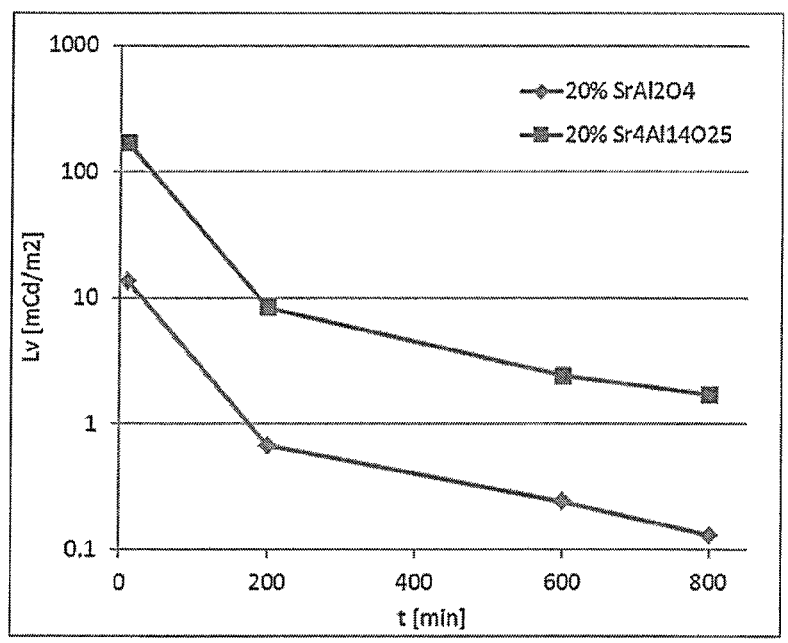

Li Ruifang, "Studies on the Surface Modification and Application of SrAl2O4:Eu2+, Dy3+ Phosphor," Masteral dissertation, Dalian University of Technology, China (2009), three pages.
International Search Report for corresponding PCT/EP20131073248 dated Jan. 17, 2014, four pages.
Espacenet bibliographic data for JP2004292588 published Oct. 21, 2004, one page.
Gao et al., "Improved Performance of Strontium Aluminate Luminous Coating on the Ceramic Surface," Journal of Physics: Conference Series 152 (2009) four pages.
Van den Eeckhout et al., "Persistent Luminescence in Eu2+-Doped Compounds: A Review," Materials 2010, 3, pp. 2536-2566.
O. C. Standard et al., "Densification of Zirconia—Conventional Methods," Key Engineering Materials, vols. 153-154, 1998, pp. 251-300.

* cited by examiner

WATCH COMPONENTS

TECHNICAL FIELD

The present invention relates to watch components made from a ceramic composite material which displays high mechanical strength and is capable to display a persistent phosphorescence.

STATE OF THE ART

Zirconium dioxide (or zirconia, $ZrO_2$) is one of the most studied ceramic materials. $ZrO_2$ adopts a monoclinic crystal structure at room temperature and changes to tetragonal and cubic structures at higher temperatures. The volume expansion caused by the cubic to tetragonal to monoclinic transformation induces large stresses, and these stresses cause $ZrO_2$ to crack upon cooling from high temperatures. When the zirconia is blended with other oxides, the tetragonal and/or cubic phases are stabilized. Effective dopants include magnesium oxide (MgO), yttrium oxide ($Y_2O_3$, yttria), calcium oxide (CaO), and cerium oxide ($Ce_2O_3$).

Zirconia is often more useful in its phase 'stabilized' state. Upon heating, zirconia undergoes disruptive phase changes. By adding for example small percentages of yttria, these phase changes are minimized, and the resulting material has superior thermal, mechanical, and electrical properties. In some cases, the tetragonal phase can be metastable. If sufficient quantities of the metastable tetragonal phase are present, then an applied stress, magnified by the stress concentration at a crack tip, can cause the tetragonal phase to convert to monoclinic, with the associated volume expansion. This phase transformation can then put the crack into compression, retarding its growth, and enhancing the mechanical properties. This mechanism is known as transformation toughening, and significantly extends the reliability and lifetime of products made with stabilized zirconia.

It has been described by Drennan and Hanninck (J. A. Ceram. Soc. 1986; 69(7): 541-546) that the addition of SrO effectively neutralizes the detrimental effects of the $SiO_2$ contaminant in zirconia partially-stabilized with magnesia. It seems that this effect is obtained through the formation of a glass phase that comprises Si and Sr, which is ejected from the bulk of the ceramic during sintering. Cutler and Virkar (J. A. Ceram. Soc. 1991; 74(1): 179-186) have shown that the addition of SrO and $Al_2O_3$ to Ce-doped zirconia leads to mechanical strengthening of the zirconia, through the formation of strontium aluminate platelets ($SrAl_{12}O_{19}$). This makes possible the production of tough Ce-zirconia with good hardness and strength. $SrAl_{12}O_{19}$ is also known to show persistent phosphorescent properties when appropriate rare-earth dopants are included in the material. However, the strontium aluminate phase described by Cutler and Virkar is not phosphorescent, presumably because the Ce is not incorporated into the strontium aluminate phase and the oxidation state is the non-active $Ce^{4+}$ state.

A composite «ceramic» material for optical conversion applications is described in EP 1 588 991 A1, one of the phases being a fluorescent phase. The examples in the document are focused on a composite of $Al_2O_3$ and Ce-doped $Y_3Al_5O_{12}$. The material is obtained by mixing the basis materials and subsequent «fusion» at 1900-2000° C. under vacuum, without any further heat treatment. The materials are described to convert blue light between 430 and 480 nm (such as the light emitted by a blue LED) into "white" light. To this end, the material transmits part of the emitted blue light, while another part is converted into yellow light by the $Y_3Al_5O_{12}$:Ce phase (broad emission spectrum centred around 530 nm). The resulting colour which appears as a white light can be adjusted by varying the thickness of the material.

Document WO 2006/097876 A1 describes a polycrystalline ceramic material that comprises a fluorescent material. Ideally, the ceramic is alumina and the phosphor is a Ce-doped YAG (such as $Y_3Al_5O_{12}$:$Ce^{3+}$). The ceramic material is intended to convert part of the blue light emitted by a LED into yellow light, in order to obtain white light. The material is obtained by mixing alumina and phosphor powders in a slurry, with subsequent pressing and HIP-sintering. The material comprises typically 80 to 99.99 vol. % alumina and 0.01 to 20 vol. % phosphor.

A further ceramic composite for optical conversion is described in WO 2008/096301 A1, where both luminescent and non-luminescent phases comprise Si and N. The application discloses in particular the realization of $BaSi_7N$ and $(Ba,Sr)_2Si_{5-x}Al_xN_{8-x}O_x$:Eu (obtained by sintering in reducing atmosphere and subsequent washing in acidic solution), the mixing of both components and HIP heat treatment at 1550° C. and 80 MPa, optionally followed by a heat treatment under $N_2$ at 1300° C.

In WO 2011/094404 A1 a ceramic for optical conversion is described with a fluorescent phase of YAG:Ce with pores of well-controlled size and shape. The formation of the pores is conducted through heat treatment whereby pore-forming additives are removed or burned out. The process consists in a first step of debinding by heating in air at typically 1150° C., followed by a second step of sintering in a wet hydrogen atmosphere at 1700-1825° C. Through this process a material with a high degree of transparency or translucency is obtained.

OBJECT OF THE INVENTION

There is no disclosure of watch components made from a ceramic material, in particular a zirconia-based material, which comprises a persistent phosphorescent phase, in particular a persistent phosphorescent phase that still emits significant light intensity hours after having been excited. In different technical fields there is an interest in obtaining a material which displays a high mechanical stability and at the same time a persistent luminescence. For instance a persistent phosphorescent effect is required in applications for watches or for indicators, or as a luminous paint or pigment for e.g. safety applications. In such applications it may be appropriate to arrange the luminescent effect according to a specific pattern, for technical reasons or motivated by design considerations.

It is an object of the present invention to obviate the disadvantages of the prior art. In particular it is an object of the present invention to provide watch components made from a ceramic composite material which displays mechanical strength and is capable to display persistent phosphorescence in a certain pattern.

DESCRIPTION OF THE INVENTION

First, the persistent phosphorescent ceramic composite material of the watch component is described.

A "persistent phosphorescent material" in the context of the present invention means a solid luminescent material which shows light emission after the exciting radiation has ceased, with an afterglow on the order of a few minutes to several hours. This includes, but is not necessarily limited to, solid luminescent material which shows long phosphorescence or long persistence corresponding to an afterglow persistent time over 500 minutes. The persistent time refers to the time that it takes for the afterglow to decrease to a luminance of 0.3 mCd/m$^2$, which is the lower limit of light perception of the human eye (see, e.g., the "Phosphor Handbook", S. Shionoya and W. M. Yen, editors, CRC Press 1999, chapter 12).

The persistent phosphorescent ceramic composite material is a dense body. The dense property of the persistent phosphorescent ceramic composite material provides the wanted enhanced phosphorescence performance and the favorable mechanical properties. What is understood to be a "dense" body will be described hereafter. In order to achieve the dense character of the persistent phosphorescent ceramic composite material, the preparation comprises a densifying step leading to a densified body. The manner of the densifying step is described hereafter in the context of the method of the present invention.

It is important that the densified body has been sintered during its preparation, since without the appropriate manner of sintering the wanted effect of the present invention, in particular the effect of the persistent phosphorescence, is not achieved. The appropriate manner of sintering or heat treatment will be described hereafter in the context of the method of the present invention.

The sintered solidified body comprises two or more phases, in particular two or more crystalline phases. The first phase, which is usually the phase which is present in the highest amount by weight, is the phase which is the basis for the mechanical properties, while the second phase is responsible for the phosphorescent properties of the ceramic composite material and shows the type of composition which is usually called a phosphor. The persistent phosphorescent ceramic composite material is a composite material. A "composite material" in the context of the present invention is a bulk composite which means that the two or more phases are not separated in different parts of the dense body. For example, the second phase does not form a thin layer or a coating on the first phase.

The first phase consists of at least one metal oxide. Any metal oxide may be chosen which displays a high level of mechanical stability. Accordingly the metal oxide may be selected from aluminium oxide, zirconium oxide, magnesium oxide, silicon oxide, titanium oxide, barium oxide, beryllium oxide, calcium oxide and chromium oxide.

Of the possible useful materials for the first phase zirconia is preferred. Zirconia is highly stable and displays excellent mechanical properties. The material is reliable by itself, but according to a preferred embodiment it is used in a stabilized form. This stabilization can be achieved through the presence of a further material in a specific amount. This further present stabilizing material may be selected from materials derived from cerium, magnesium and yttrium.

Ce-doped zirconia can be used, although an orange-coloured zirconia would be obtained after treatment in reducing atmosphere.

Mg-doped zirconia may be used as well, but a compromise would have to be made between the day colour of the composite, luminescence performances and mechanical properties.

It has turned out that, in the context of the present invention, the presence of yttria as a dopant in the zirconia leads to a high degree of mechanical stability and the yttria-doped zirconia is the preferred material for the first phase. Zirconia stabilized with yttria is for instance produced by the company Tosoh Corporation and a typical product which is particularly useful in the preparation of the ceramic composite material of the present invention is 3 mol % yttria stabilized tetragonal zirconia. From the point of view of the inventors, yttria-doped zirconia offers the best potential in terms of day colour, excellent persistence of the phosphor phase and very good mechanical properties.

Instead of zirconia, or of yttriated zirconia according to the preferred embodiment, alumina may be used as well as a further preferred species, but this may be less successful, since non-luminescent phases can be formed during sintering. Furthermore, the heat treatments which have to be conducted in the preparation of the phosphorescent ceramic composite material according to the present invention have to be performed at a higher temperature than for zirconia.

Zirconia may also be used in a doped form and/or with the addition of pigments to modify its day colour, provided that the zirconia has been stabilized.

The second phase of the ceramic composite material consists of a metal oxide which contains at least one activating element in a reduced oxidation state.

As the metal oxide material Ca, Ba, Sr and/or Mg-aluminates may be used, or Ca, Ba, Sr and/or Mg silicates, or Ca, and/or Sr aluminosilicates. The preferred metal oxide material in the context of the present invention is strontium aluminate. As such strontium aluminate $SrAl_2O_4$, $SrAl_4O_7$, $SrAl_{12}O_{19}$ or $Sr_4Al_{14}O_{25}$ may for example be used, whereby the most preferred type is $Sr_4Al_{14}O_{25}$. One of the advantages of $Sr_4Al_{14}O_{25}$ is the circumstance that it is insoluble in water, which may be an advantage in the method for the preparation of the ceramic composite material, since it allows to mill the powder in water and to atomize the resulting slurry. It is a further advantage that is stable at the usual sintering temperature of yttriated zirconia as the preferred embodiment of the metal oxide of the first phase.

The metal oxide of the second phase of the ceramic composite material is doped with at least one activating element. As such an activating element any of the rare earth elements La, Ce, Pr, Nd, Pm, Sm, Eu, Gd, Tb, Dy, Ho, Er, Tm, Yb and Lu may be chosen. The addition of any of these elements to the metal oxide of the second phase of the ceramic composite material, in particular to strontium aluminate as the preferred embodiment of the metal oxide of the second phase of the ceramic composite material, may lead to the wanted phosphorescent effect of the ceramic composite material. The preferred types of the activating elements are Eu and Dy and it has been found that the most preferred embodiment of the second phase is $Sr_4Al_{14}O_{25}$ doped with Eu and Dy ($Eu^{2+}/Dy^{3+}$ doped $Sr_4Al_{14}O_{25}$).

Other types of second phase material may be selected. However, the use of such other materials may lead to ceramic composite material with lower performance, since non-luminescent phases can be formed during sintering.

The amount of the at least one activating element in the metal oxide of the second phase can be chosen based on the effect which shall be achieved. A typical content of Eu in strontium aluminate as the metal oxide of the second phase is between 0.05 and 4%, preferably between 0.15 and 1% by weight (relative to the total weight of the second phase material). This low concentration of Eu leads to a white phosphor powder which does not display the usual yellowish tint which is usually obtained in commercially available phosphors, but retains a high luminescence and phosphorescence intensity, as exemplified in patent application EP 2 626 401 A1. This low concentration of Eu is also of interest for the final phosphorescent ceramic composite material according to the present invention intensity in the final phosphorescent ceramic composite material.

The amount of the at least one metal oxide of the first phase shall be 5 to 95%, relative to the total weight of the materials of the first and the second phase. In that case the amount of the metal oxide containing the at least one activating element of the second phase shall be 5 to 95%, also relative to the total weight of the materials of the first and the second phase. The preferred amount of the at least one metal oxide of the first phase shall be 40 to 95% by weight, the further preferred amount shall be 50 to 95% by weight and the most preferred amount shall be 50 to 80% by weight, in all these cases relative to the total weight of the materials of the first and the second phase, and the corresponding amounts of the metal oxide containing the at least one activating element of the second phase shall be 5 to 60% by weight, 5 to 50% by weight and 20 to 50% by weight, respectively, relative to the total weight of the materials of the first and the second phase.

The ceramic composite material which is finally obtained is a dense material. As will be described hereafter, the ceramic composite material is prepared in a manner that a binder material, which is usually present in the first step of preparing the green body as the precursor of the ceramic composite material, is removed, for example by a heating step, and pores are generated in this step of removing the binder material. These generated pores are subsequently eliminated in subsequent heating steps, as will be described in connection with the method for the preparation of the persistent phosphorescent ceramic composite material according to the present invention.

A "dense body" in the context of the present invention means a body which is essentially without remaining pores, in other words a body in which the porous character has been minimized. The dense body displays a density which is at least 90% of the theoretical maximum density. The theoretical maximum density is the density without any remaining pores. It can be estimated by taking into account each phase which is present and the relative concentration and the density of each phase.

The theoretical maximum density can be calculated based on the knowledge of the density values of the different components in the composite material. For example, in case of a composite material comprising 80% by weight of zirconia containing 3% of yttria as the preferred type of material for the first phase of the sintered solidified body and 20% by weight of $Sr_4Al_{14}O_{25}$ as the preferred embodiment of the second phase of the sintered solidified body, the theoretical maximum density can be calculated as follows. Based on the density for the yttriated zirconia of 6.1 $g/cm^3$ and the density for $Sr_4Al_{14}O_{25}$ of 3.65 $g/cm^3$, a theoretical density for this composition of 5.38 $g/cm^3$ is calculated. With 30% by weight of $Sr_4Al_{14}O_{25}$ and 70% by weight of yttriated zirconia the calculated density value is 5.08 $g/cm^3$, and with 50% by weight of $Sr_4Al_{14}O_{25}$ and 50% by weight of yttriated zirconia the calculated density value is 4.57 $g/cm^3$. Such calculated values are an appropriate basis for the calculation of the density although it must be recognized that there is an aspect of uncertainty due to the circumstance that the measurement of the phase concentration is not precise and the different phases are not necessarily phase-pure.

It is a preferred embodiment for the dense body that its density is at least 97% of the theoretical maximum density and a more preferred embodiment that the density is at least 98% of the theoretical maximum density.

Since, as mentioned above, there will be a step of removal of the binder material, for example through heating, the binder material itself will not be identified in the final sintered ceramic composite material.

The watch component of the present invention has a surface which comprises an area which is phosphorescent besides an area which is not phosphorescent.

The manner of achieving the area with the phosphorescent properties is described hereafter.

Providing a part of the surface with non-phosphorescent character can be achieved by providing a shielding layer on the surface of the watch component. This shielding layer, or opaque layer, or absorbing layer, or non-transparent layer, shall be non-transparent to light, so that any transmission through the shielding layer of external radiation having a range of wavelength that makes it capable to excite the phosphor is prevented, or at least greatly reduced, and/or any transmission of light emitted from material below the shielding layer in this area would be absorbed or at least greatly reduced as well.

According to a preferred embodiment of the present invention, an effective shielding layer shall be made from an appropriate metallic material. Such metallic material may be selected, for example, from the group consisting of Au, Ag, Ni, Pt, Pd or alloys of these. The choice of the metallic material may depend on the particular combination with the ceramic composite material and the resulting optical effect.

According to another embodiment of the present invention, an effective shielding layer shall be made from oxides, nitrides, and/or carbides such as for example CrN, TiN, or ZrN. The choice of the oxide, nitride, and/or carbide materials may depend on the particular combination with the ceramic composite material and the resulting optical effect.

According to another preferred embodiment of the present invention, the shielding layer can be realized by forming successive or stacked layers of different materials on the surface of the ceramic composite material, for example by depositing as a first layer a tie layer to enhance adhesion on the composite and as a second layer a different material, such as a metallic material, on top of the tie layer.

For applying the shielding layer, any conventional manner known in the state of the art may be chosen. For example, deposition of the metallic material with chemical vapor deposition (CVD), physical vapor deposition (PVD) or a galvanic method is possible. For example, deposition of the oxide, nitride, and/or carbide material with atomic layer deposition (ALD) or physical vapor deposition (PVD) is possible.

The thickness of the shielding layer depends on the material which is used in its preparation. A thickness of at least 10 nm is preferable to achieve the effect of the partial or full inhibition and/or partial or full absorption of the phosphorescence. For example, tests have shown that a layer of gold of 10 nm thickness decreases the emitted intensity by 90%, whereas a layer of gold of 40 nm thickness decreases the emitted intensity by 99%. A thickness of more than 0.8 mm shall not be required and shall be avoided for leading to unnecessary use of metal material and giving the watch component a bulky effect. A more preferred range of the thickness of the shielding layer shall be 20 to 10,000 nm, even more preferably between 40 and 4,000 nm.

The shielding layer shall not cover the complete surface of the watch component. There is no particular limitation to the relative area of the total surface of the watch component which is covered with the shielding layer. The area covered with the shielding layer shall be preferably between 1 and 99% of the total surface of the watch component. In this definition the total surface shall be the relevant surface of the watch component in the sense of the surface which shall be accessible to the eye of the observer. Within this range, any particular value of the covered relative area may be chosen.

The specific pattern of the phosphorescent area may be chosen according to any particular requirement. Possible ways to obtain specific patterns will be described hereafter in connection with the context of the method of the invention.

Besides the application of a shielding layer there are other ways to achieve the wanted feature in the watch component of a surface with a phosphorescent area and a non-phosphorescent area, or of a surface with a phosphorescent area and a less phosphorescent area.

Such a further manner of providing a part of the surface with a non-phosphorescent character involves a treatment step to change the properties of the phosphorescent ceramic composite material without requiring an additional shielding layer or coating. Different methods for this are available. It is possible to change the process for the preparation of the phosphorescent ceramic composite material so that the final product contains areas with different production methods.

It is also possible to conduct the preparation of the watch component in a particular manner and to conduct a treatment of this material during fabrication and/or after completion of the preparation of the ceramic composite material to change its properties according to a particular pattern which neutralizes the phosphorescent effect which is displayed in a certain area, as will be described below.

Next the method for preparing the watch component according to the present invention is described.

The description of the preparation of the ceramic composite material is provided first.

In a first step the materials for the ceramic composite material are mixed as powders.

The manner for mixing the materials is not particularly limited and any conventional mixing procedure may be used.

The process comprises the mixing of the metal oxide and the phosphor powder, optionally with stabilizers and binders, and the subsequent shaping of a powder compact (hereafter designated as the green body).

The metal oxide which is used is the metal oxide of the first phase of the ceramic composite material described above. The phosphor which is used is the metal oxide containing the at least one activating element of the second phase of the ceramic composite material as described above.

The binders which are optionally used in the preparation of the green body are not particularly limited and any material which is suitable in aiding the formation of the green body may be used. Regularly the binder material is an organic material and as such an organic material a polymer material such as, for example, polyethylene glycol (PEG), polyvinyl acetate (PVA), polytetrafluoroethylene, ethylene-vinyl acetate, polyethylethacrylate, or poly(methacrylate)-co-ethylene glycol dimethacrylate (PMMA) may be chosen.

The presence of such an organic binder makes the formation of the green body easier. Methods for preparing the green body include injection molding, tape casting, dry pressing, slip casting, gel casting, direct coagulation casting and extrusion.

Hereafter the green body is treated with heat in a number of different steps. It is a first optional step to treat the green body with heat in order to remove the binder material insofar as it has been present during the preparation of the green body. This is called the debinding step. In this debinding step, pores are generated through the removal of the binder material in the heat-treated green body.

When conducted by heating, the debinding step is usually conducted at a temperature of at least 450° C., preferably in an oxidizing atmosphere, the selected temperature and the selected atmosphere depending on the character of the binder material.

Alternatively and depending upon the nature of the binder material, the debinding step can be carried out by other means, such as for example catalytic debinding, or solvent-based debinding.

The debinding step is followed by a first sintering step. The first sintering step is conducted at a temperature in the range of typically 800 to 1600° C. It is the intention of the first sintering step to densify the material. This is achieved by an effect of the heating on the pores which are present, whereby an elimination of the pores is initiated. A preferred range for the temperature in the first sintering step may be the range between 850 and 1200° C., and a typical temperature chosen for first sintering is 900° C. It has been observed that presintering at high temperatures such as temperatures in the range of 1450 to 1500° C. can lead to a slightly decreased performance as a phosphorescent composite material.

The first sintering is preferably conducted in an oxidizing atmosphere. Such an oxidizing atmosphere is regularly an ambient atmosphere, meaning in the presence of air at normal ambient pressure. Instead of air, an enriched oxygen atmosphere may be used as well, but this has no technical advantage. The debinding and first sintering can be also conducted under neutral or reducing conditions, although tests have shown that this approach is less favourable.

It is possible to combine the two steps of debinding and the first sintering in one single step. The conditions of this single treatment step must comply with the requirements for debinding as well as for the sintering of the first step. This means that the treatment temperature must be chosen to be in a range which allows the removal of the organic binder material under formation of pores of suitable size, or that two temperatures are chosen for the debinding step and the first sintering step without cooling the material to room temperature in between the steps.

If the wanted effect is not achieved in the one single step, then the debinding and the sintering under oxidizing conditions are conducted in two separate steps, but a treatment in one single step is in general more favourable.

The first sintering step is followed by a second sintering step which is conducted under reducing conditions. The reducing conditions in the sense of the present invention are such conditions in which a reduction of the activating element or elements in the phosphor as the second phase of the ceramic composite material is achieved, but at the same time a reduction of the metal oxide in the first phase of the ceramic composite material is avoided.

A usual temperature condition for performing the second sintering step is the choice of a temperature in the range of 800 to 1600° C., with a preferred temperature of 1350 to 1550° C. and with a more preferred temperature of 1450 to 1500° C. The duration of the treatment at this temperature depends on the composition of the composite and the temperature which has been chosen. A regular treatment condition is a duration of the treatment of 3 hours at a temperature of 1450° C. This means that the effective temperature of 1450° C. is maintained at a constant level for this duration of 3 hours. The total heat treatment involves a ramp-up period involving a heating of for instance 150° C./h and a cooling period of for instance 4 hours.

The atmosphere for the second sintering step is a reducing atmosphere. Any type of atmosphere which succeeds in reducing the activating elements in the activated metal oxide phase can be chosen. A typical reducing atmosphere is an atmosphere of hydrogen in argon (Ar/H$_2$) or an atmosphere of hydrogen in nitrogen (N$_2$/H$_2$).

As an alternative to the treatment in the second sintering step under reducing conditions, a sintering under neutral conditions may be possible. In that case it is possible to realize a High Isostatic Pressing (HIP) treatment in neutral atmosphere (after having sintered the material and closed the porosity), or to use spark plasma sintering (SPS) under neutral atmosphere. In both cases, the overall effect is to reduce the material as such treatments are usually performed in graphite moulds. The colour of the zirconia may be affected under these heat treatments, since it may be reduced during this treatment as well, at least in a thin surface layer. It should however be possible to remove such grey or black colour by mechanical polishing or through heat treatment in oxidising atmosphere at T<900° C.

It has turned out that the sintering step under reducing conditions is the essential step in the preparation of the composite material with the wanted effects of displaying favorable mechanical properties in addition to a wanted degree of phosphorescent properties. Before the second sintering step under reducing conditions, the material does not display the properties of a phosphor and no luminescence is observed. At least one heat treatment in reducing or neutral atmosphere at a temperature of at least 800° C. is required to obtain a functional material.

The sintering step under reducing conditions leads to a reduction of the activating elements in the phosphor. It is an essential feature of the invention that this step in the preparation only reduces the activating elements in the second, phosphorescent phase of the ceramic composite material. If for instance the metal oxide in the first phase is zirconia, the reduction of the zirconia would lead to a changed color of this component. Zirconia has a white color, but the reduced form is grey-black which would normally be a highly unwanted color change. It is the surprising effect of the method of the invention that the sintering step under reducing conditions preferentially reduces the activating elements in the phosphorescent phase and not the further components which are present, and in particular not the material of the first phase.

That zirconia is not reduced is very surprising, since the literature indicates that a heat treatment of zirconia under reducing atmosphere at high temperatures results in a blackening of the ceramic. One possibility could be that the presence in the ceramic of an activating element which is more easily reduced than the ZrO$_2$, such as the rare earth element(s) (Eu$^{3+}$ for example) contained in the second phase, prevents the colour change of zirconia.

The sintering step under reducing conditions preferably optimizes the density of the composite material, whereby the density reaches a maximal value and the pores which have been generated during the debinding step are essentially eliminated and no remaining pores are detected in the final product. The maximum density level is obviously achieved under the circumstance of the complete elimination of the pores.

It is also possible to conduct the different heat treatments, namely the debinding step, the sintering under oxidizing conditions and the sintering under reducing conditions, in one single heating step. It has been described above that the sintering step under reducing conditions is the essential step in the preparation of the composite ceramic of the present invention. In a combined single heating step, this single heating step shall in the first place provide the sintering under reducing conditions. Although the possibility to conduct the heat treatments in one single step is technically and economically an attractive possibility, this possibility shall only work when the different functions of the heating steps can be achieved in the single heating step. In some cases, the function of the debinding step cannot be achieved under reducing conditions, in particular for certain binder materials.

In the previous description of the watch components of the present invention, it has been described that these have a surface which comprises an area which is phosphorescent, besides or adjacent to an area which is not phosphorescent or less phosphorescent. In other words, it has been described that the watch components have a surface which comprises an area which shows phosphorescent emission, besides or adjacent to an area which does not show phosphorescent emission or which shows phosphorescent emission with an intensity that is lower than that of the emission of the other area. In yet other words, it has been described that the watch components have a surface which comprises an area which shows an emitted phosphorescent intensity, besides or adjacent to an area which does not show an emitted phosphorescent intensity or which shows an emitted phosphorescent intensity that is lower than that of the other area. There are different methods for achieving this aspect of the present invention.

For example, the material can be further treated to obtain a desired esthetical or functional effect, for example by depositing layers on parts of the surface and/or in features by PVD and/or galvanic methods, as for instance described in EP 1 548 524 A1 and EP 1 548 525 A1, or by impregnation of the green body with metallic salt solutions.

According to a preferred embodiment of the watch components, the surface shall comprise an area which is not phosphorescent by being covered with a shielding or opaque or absorbing layer, such as preferably a layer made from one or several metallic materials, and/or from one or several oxide, nitride, and/or carbide materials. In this preferred embodiment the shielding layer shall be provided on the surface of the watch component in a specific manner of any shape or pattern according to the design of the producer.

There is no particular limitation to the relative area of the total surface of the watch component which is not phosphorescent or which is less phosphorescent. This area which is not phosphorescent or which is less phosphorescent shall be preferably between 1 and 99% of the total surface of the watch component. In this definition the total surface shall be the relevant surface of the watch component in the sense of the surface which shall be accessible to the eye of the observer. Within this range, any particular value of the covered relative area may be chosen.

In the context of the present invention, the patterns are microscopic or macroscopic, in the sense that they have a typical dimension or characteristic size of 10 μm or more, preferably of 100 μm or more, for example to form digits and/or letters and/or geometric patterns on the surface of the watch component.

One of the methods which is well known in the state of the art for treating locally and selectively the surface of a solid body is based on using the photofabrication or photolithography technique.

Photofabrication is a generic term for techniques in which a photoresist comprised of a photosensitive or radiation-sensitive resin composition is coated on the surfaces of process articles such as silicon wafers or other substrates and the coating films formed are patterned by photolithography.

Photolithography is a process used in microfabrication to transfer a geometric pattern from a photomask to a light-sensitive chemical "photoresist", or simply "resist", which is deposited on the substrate. The resist is exposed to light through the photomask, which transforms the exposed parts. In the case of a so-called positive resist, the portion of the photoresist that is exposed to light becomes soluble to a solvent or surface treatment (the photoresist developer or development treatment), while the portion of the photoresist that is unexposed remains insoluble to the photoresist developer or treatment. In the case of a negative resist, the portion of the photoresist that is exposed to light becomes insoluble to the photoresist developer or treatment, and the unexposed portion of the photoresist is dissolved by the photoresist developer. One obtains thereby a photoresist pattern on the surface, with parts of the surface protected by the photoresist and other parts that are not covered. These patterns are acting as masks in the following step of layer deposition, or electroforming chiefly using electroplating, any of which are applied alone or in combination, to deposit the material or materials forming the shielding layer.

In the photofabrication technique which may be applied in the context of the present invention, it is possible to use a positive or a negative photoresist.

A negative photoresist is usually an organic material which, when exposed to radiation, undergoes chemical reactions of the type referred to as crosslinking, which reactions result in insolubilizing the exposed photoresist. The crosslinking reactions are of the type that can be initiated either by light or by electrons. Because it is possible to generate electron beams of substantial energy but of small diameter, their use in the generation of small patterns is sometimes preferred to the use of light. Electron beams also have a much better resolution capability than is possible when using an optical mask and light exposure, and they have a much greater depth of focus. The exposure of a conventional positive photoresist involves solubilization of the exposed areas, and the chemical reactions involved are of the scission or degradation type, which also require absorption of light or electrons. Because this type of photoresist requires higher flux densities for proper exposure than negative photoresists require, electron beams are not widely employed to this end.

In both methods of applying the positive resist or the negative resist the final effect which is achieved is that a surface of the substrate, in the context of the present invention the ceramic composite material, is partly covered with the deposited resist.

In one method which is preferred in the present invention, a shielding layer is deposited on the exposed part of the surface, for example by ALD, PVD, CVD, or by galvanic techniques. The shielding layer is preferably made from a metallic material and/or from a oxide, nitride, and/or carbide material and/or from a combination of those. The shielding layer can be realized by depositing one layer or thin film of a given material, or by depositing several layers or thin films of different materials in succession, using the same deposition technique or using different deposition techniques. Examples for providing such layers are provided in the documents EP1548524 and EP1548525. The material which is used for preparing the layer can be selected from the group consisting of Au, Ag, CrN, Ni, Pt, TiN, ZrN, Pd or mixtures of these materials. The material layer is deposited on the surface and resist pattern.

After this deposition, the remaining photoresist is removed through the treatment with a stripping solution. Removing the remaining photoresist leaves a pattern of metal or other material on the surface. With an appropriate material and thin film thickness, light from the environment is absorbed by the layer and/or the emission from the underlying composite phosphorescent material is absorbed by the layer, resulting in light emission from part of the surface of the component only.

Further techniques are available as the method according to the invention which do not involve a photofabrication technique.

According to a further embodiment for the preparation of an area which is not phosphorescent, a part of the surface of the watch component is colored, for example by local impregnation with a solution of metallic salts before sintering and subsequent heat treatment, thereby forming colouring pigments in the treated zones. With an appropriate pigment type, pigment density, and thickness of treated material, light from the environment is absorbed and/or the emission from the composite phosphorescent material is absorbed, resulting in light emission from part of the surface of the component only.

According to yet a further embodiment, a part of the surface is treated in such a way that the luminescent phase is deactivated. This could be realized by local impregnation with a solution of metallic salts before sintering and subsequent heat treatment, or by electrochemical methods, or by ionic implantation. With an appropriate treatment, no light is emitted from the treated zones of the composite material, resulting in light emission from part of the surface of the component only.

It is also possible in another embodiment that part of the surface of the watch component is treated in such a way that the luminescent phase is deactivated and/or that the emitted luminescence is absorbed. This can be realized by local modification of the material by laser treatment, for example by a laser with femtosecond impulsions. One possibility using such a femtosecond laser is to follow and adapt the teaching of WO2013135703A1, in order to ablate the material and/or to form a light-absorbing layer in the treated zones, resulting in light emission from part of the surface of the component only.

In yet another embodiment, two different materials can be combined to realize the watch component. For example, the watch component can be realized by using a standard ceramic material, and the phosphorescent ceramic composite material can be overmolded on the ceramic material to form patterns. The standard ceramic material can be, for example, an yttria-stabilized zirconia, without or with the addition of pigments.

The above methods can be combined at will and/or can be combined with known means for shaping and/or modifying the surface of ceramics components, and in particular of ceramic watch components, provided that they are compatible with each other. As an example, the surface of the composite ceramic component can be shaped in order to form features on its visible surface, such as hollows having a given depth and side walls that are perpendicular to the visible surface. A first layer can be deposited on the bottom of the hollows, such as described in EP1548524, and/or a second layer can be deposited on part of the surface outside of the hollows, whereby the second layer can be of a different material than that of the first layer or identical to it (and, in that case, deposited at the same time as the first layer or not). With appropriate materials and/or treatments, the emission from the composite phosphorescent material is modified, resulting in light emission from part of the surface of the component only. As a further example, the entire surface of the component can be colored through impregnation with a metallic salt solution of the green body followed by sintering, thereby preventing light emission. Patterns can then be realized by removing locally the colored surface region, for example by machining with standard techniques, or by ablation with a laser beam, in particular with femtosecond laser impulsions. As a further example, a shielding layer can be deposited on the entire surface of the component, thereby preventing light emission. Patterns can then be realized by removing locally the shielding layer, for example by ablation with a laser beam, in particular with femtosecond laser impulsions.

Of course, instead of being completely opaque, the deposited layer can be deposited in such a way that the emitted light intensity is lower as compared to the non-covered zones. Alternatively, instead of being completely non-emitting, the treated zones could be treated in such a way that the emitted light intensity is lower as compared to the non-treated zones. In both cases, this results in light emission with different intensities from different parts of the surface of the component. In other words, the watch component has a surface which comprises an area which shows phosphorescent emission and an area which shows phosphorescent emission with an intensity that is different (higher or lower) than that of the emission of the other area. In one embodiment, the different areas show significantly different emitted intensities, with the smallest difference in emitted intensity between the different areas being at least 20%, preferably at least 50%, more preferably at least 90%. In another embodiment, the different areas show different emitted intensities that can be slight, with the smallest difference in emitted intensity between the different areas being between 0.1% and 1%, allowing thus to realize grey levels, in order to form an 8-bit greyscale image for example. In any case, the differences in emitted intensity should be deliberate and/or controlled, in the sense that they result from an additional feature, layer or treatment of the phosphorescent ceramic composite material, as opposed to random and/or uncontrolled variations in material composition or concentration of the second, phosphorescent phase in the material.

Through the method of the present invention, a ceramic composite component with excellent mechanical properties and excellent persistent luminescence is obtained, with only part of the surface which emits light so that there are active/luminescent areas and non-luminescent areas, or with different parts of the surface that emit different intensities. The obtained material opens many possibilities in terms of performances and design, as it is tough, hard, and mechanically resistant. It can be used to realize, e.g., exterior parts (watch case, bezel) as well as interior elements (dial, luminescent indexes, hands) of a watch. The presence of a phosphorescent area besides a non-phosphorescent area is a useful manner to provide watches with specific luminous properties.

FIGURES

FIG. 1. Intensity of emission Lv as a function of time t of phosphorescent materials used in the present invention comprising different phases of strontium aluminate with rare earth activating elements.

Figure 2:
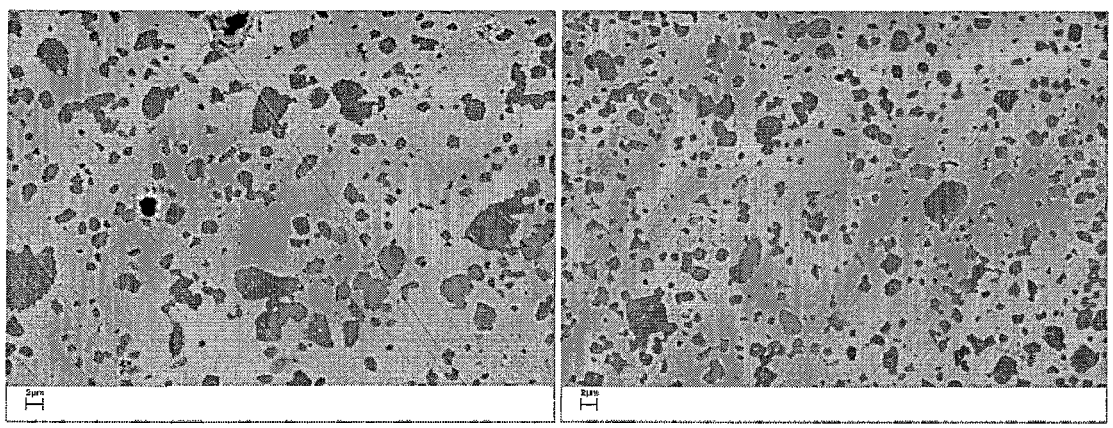

FIG. 2. Microstructures of two samples of inventive ceramic composite material realized with phosphorescent materials of standard and extrafine granulometry, respectively.

Figure 3:
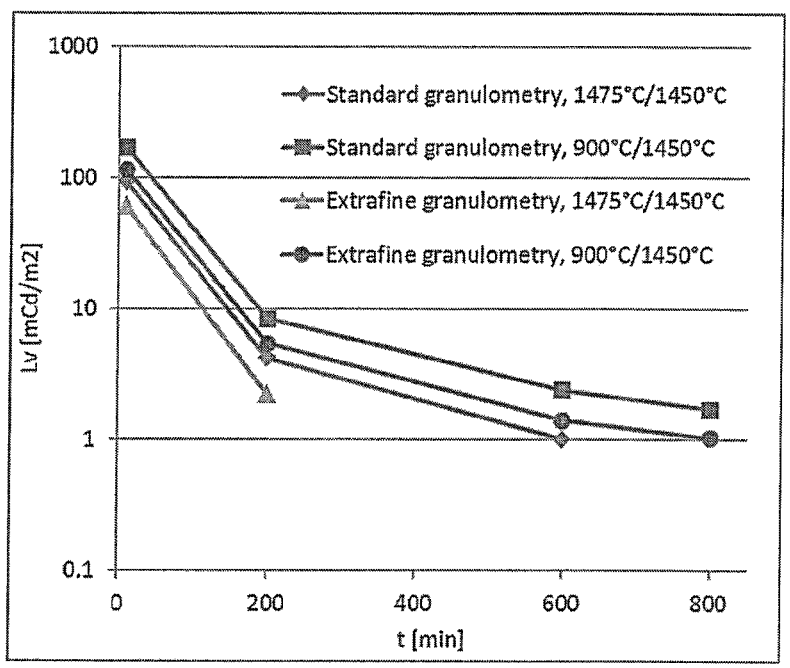

FIG. 3. Influence of initial phosphor grain size on luminescent properties of phosphor materials used in the present invention.

Figure 4:
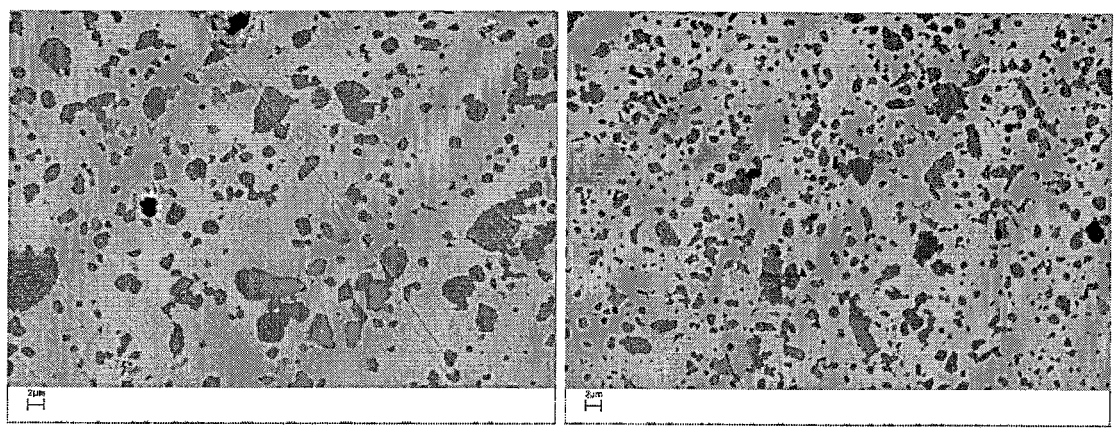

FIG. 4. Microstructures of two samples of phosphorescent composite material used in the present invention realized with phosphorescent materials without and with a washing step.

Figure 5:
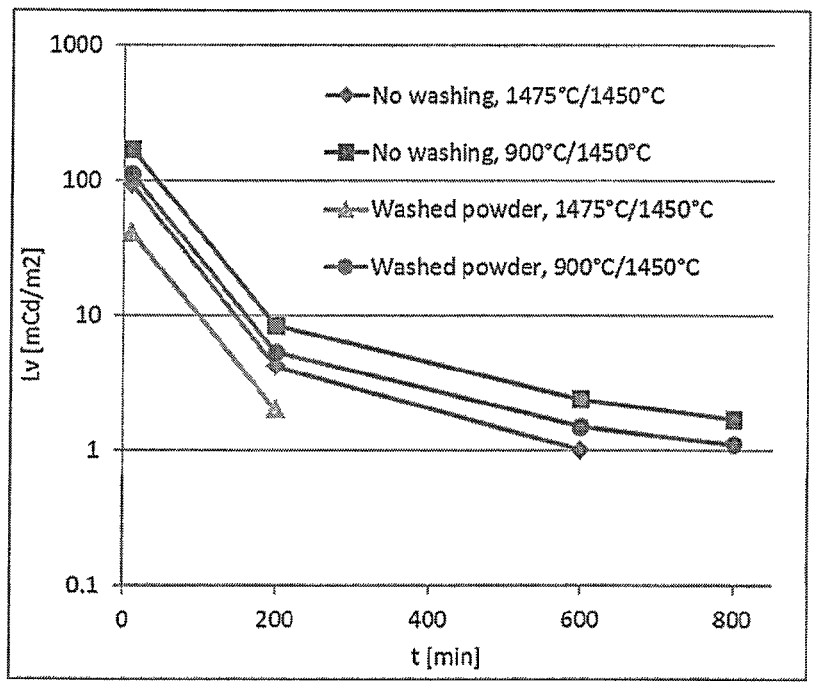

FIG. 5. Influence of washing step and treatment temperature on luminescent properties of phosphorescent materials used in the present invention.

Figure 6:
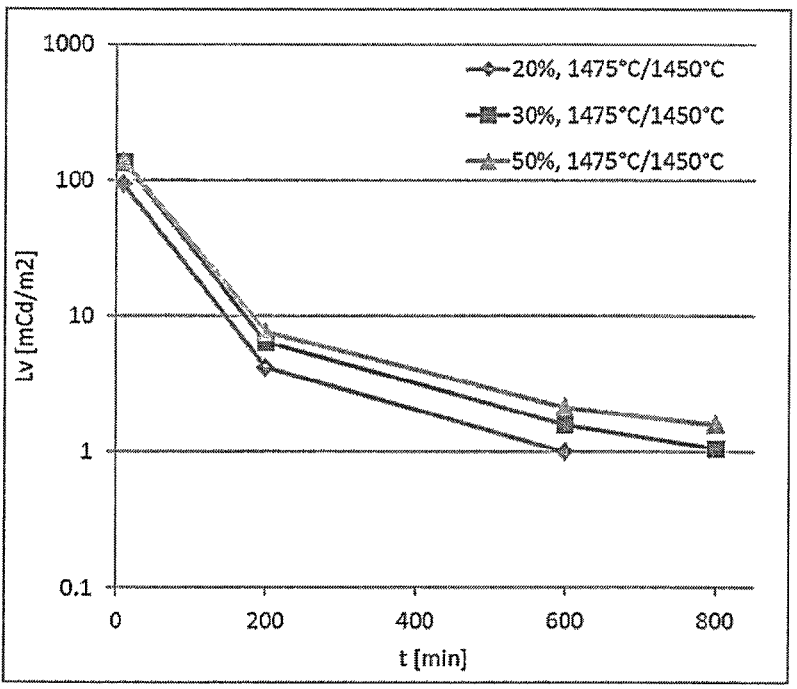

FIG. 6. Influence of phosphor concentration on luminescent properties of phosphorescent materials used in the present invention.

Figure 7:
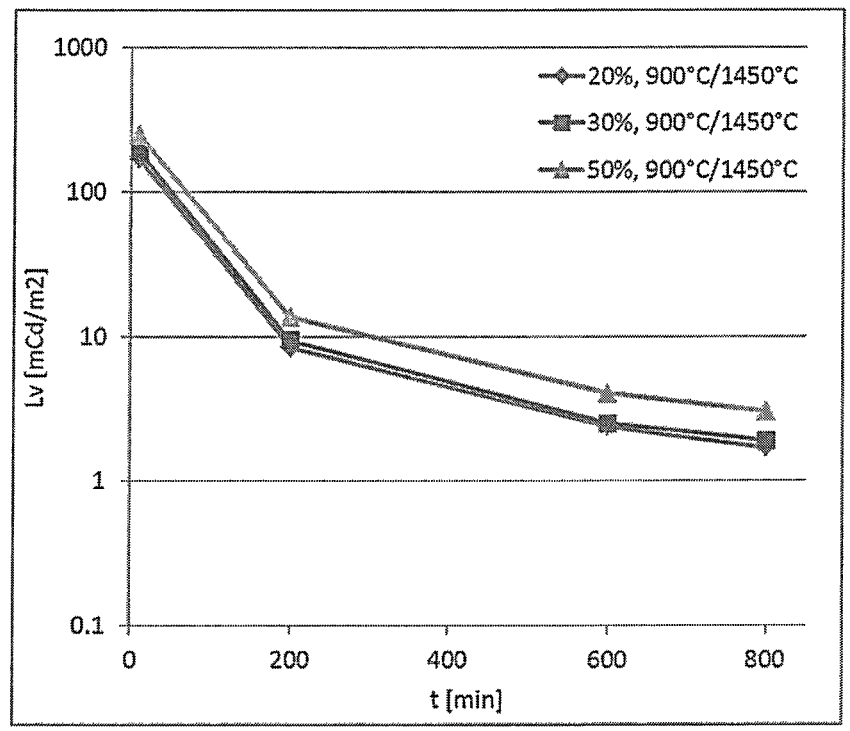

FIG. 7. Influence of phosphor concentration on luminescent properties of phosphorescent materials used in the present invention.

Figure 8:
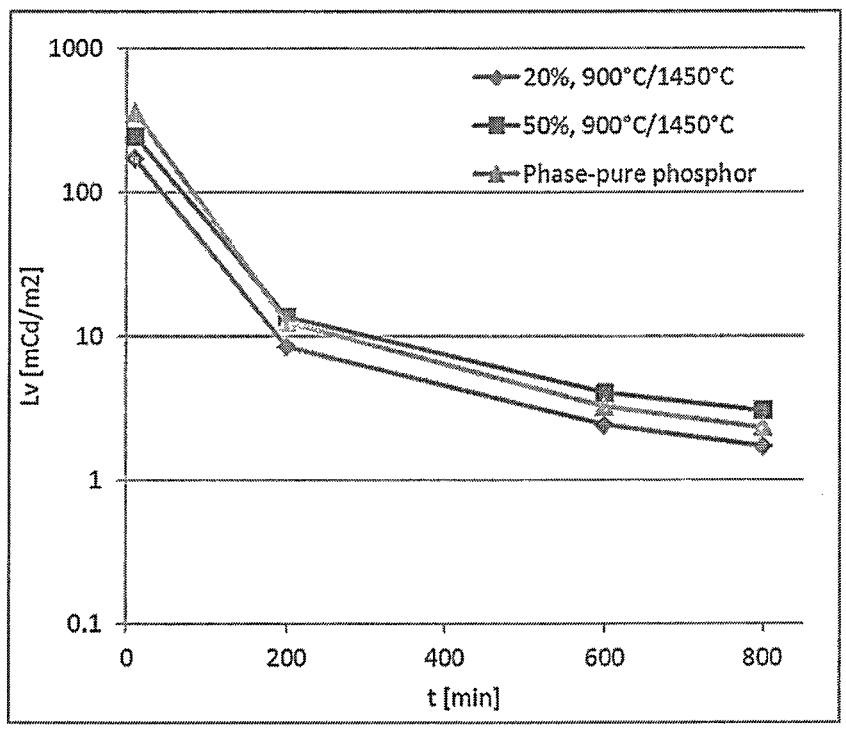

FIG. 8. Comparison of luminescent properties of phosphorescent materials used in the present invention with a pure phosphor sample.

EXAMPLES

Next the present invention is described in more detail by referring to the following examples.

Meanwhile the properties of the ceramic composite material were determined by the following methods.

The density is measured following Archimedes' method with absolute ethanol. Each sample is measured three times and the mean value is calculated.

L*a*b* colorimetry measurements are performed after machining and polishing the sample, on the free side (ie the side that was not in contact with the sample holder during heat treatment), with an aperture of 7 mm on three different locations. The equipment is a Minolta CM3610d.

The measurements of the toughness were performed by indentation with a KB250 Prüftechnik GmbH equipment. The HV5 indentations were realized under a charge of 5 kg applied during 15 s. The toughness was measured by indentation and evaluated through the formula proposed by K. Niihara (cf Niihara K., A fracture mechanics analysis of indentation induced Palmqvist crack in ceramics, J. Mater. Sci. Lett., 1983, 2, 221-223):

$$K_{Ic} = 0.018 Hv \cdot a^{0.5} (E/Hv)^{0.4} \cdot (a/c-1)^{-0.5}$$

where E is the elastic (or Young's) modulus (measured value: 220 GPa), Hv is the Vickers hardness in GPa, c is the length of the crack formed following indentation measured from the center of the indentation, and a is the half-length of the diagonal of the indentation.

HV1 microhardness was measured with a LEICA VMHT MOT equipment with a charge of 1 Kg during 15 s. 10 measurements were performed per sample.

The Young's modulus and Poisson ratio were measured by acoustic microscopy (non-destructive control by ultrasounds). The relative measurement uncertainty is 2% for both parameters.

The intensity and decay of the emitted luminescence is measured in a black chamber on up to six samples with a Pritchard PR-880 photometer. The excitation of the phosphor prior to the measurement is done in the chamber with a standard fluorescent tube. The measurement is performed in three stages: (a) the sample is kept in the black chamber during 8 hours prior to charging; (b) the excitation is realized during 20 minutes under a D65 fluorocompact lamp at an excitation intensity of 400 lux; (c) the emitted luminescence is measured during at least 900 minutes with an objective aperture of 3°, one of the samples being a reference sample. The sensitivity of the photometer is 0.9 mCd/m$^2$, to be compared with 0.3 mCd/m$^2$, which is the lower limit of light perception of the human eye.

The X-ray diffraction measurements are performed in Bragg-Brentano geometry with a Cu anode excited with 45 kV electrons. The different phases are identified on the basis of reference patterns from the literature, and the phase concentrations (given in wt % in the tables below) are estimated with a typical accuracy of 1 wt %.

Example 1

A sample 1 containing 20 wt % of phosphor has been prepared as follows:
Mixing 80.0 g of zirconia powder containing 3 mol % of yttria (TZ-3YS obtained from TOSOH Corporation) and 20.0 g of $Sr_4Al_{14}O_{25}$:Eu,Dy powder with 3.0 g of organic binder composed of 1.2 g (40%) PVA and 1.8 g (60%) PEG 20 000 in solution at 50% in water, with 200 ml distilled water and 1 kg of zirconia balls;

Attrition/milling at 400 U/min during 30 min in a zirconia bowl;
Filtering of the suspension, rinsing of the balls and bowl with 450 ml IPA, spray-drying of the filtered suspension and rinsing liquid.

7 g of powder were then pressed in a Ø 40 mm mould. During a first heat treatment, debinding and sintering were performed in one step in a furnace under ambient atmosphere, at 1475° C., with a soak-time of 2 h with 21 h ramp-up time and 11 h cooling time (total treatment time of 34 h).

The obtained pellets were machined and polished. The typical density as measured by the Archimedes method was 5.371 g·cm$^{-3}$. Typical colorimetry was L*(D65)=97.01, a*(D65)=−1.81; b*(D65)=2.21. Phase analysis by X-ray diffraction indicated that the phase ratios of the zirconia (tetragonal to cubic) were not modified with respect to a phosphor-free sample, and that the phosphor remained in the $Sr_4Al_{14}O_{25}$ phase. At this stage, the phosphor was not functional and no persistent luminescence was detected.

The second heat treatment was performed in reducing atmosphere, at 1450° C. during 4 h with a ramp-up rate of 150° C.·h$^{-1}$, under Ar/H$_2$ atmosphere. After this treatment, the samples showed persistent luminescence. The density after treatment was 5.37 g·cm$^{-3}$ and the hardness of the pellet was about 1250 Hv with a toughness of about 5.1 MPa·m$^{-0.5}$. The colorimetry was L*(D65)=92.86, a*(D65)=−1.31; b*(D65)=2.53, very close to the colour before sintering

Example 2—Effect of the Strontium Aluminate Phase

The potential of two different strontium aluminates with rare-earth (RE) dopants to obtain a persistent phosphorescent ceramic material that is suitable, e.g., for watch applications was investigated.

Two phases showed suitable performances for such applications: the $Eu^{2+}/Dy^{3+}$ doped $SrAl_2O_4$ phase which emits around 520 nm (green) and the less used $Eu^{2+}/Dy^{3+}$ doped $Sr_4Al_{14}O_{25}$ phase which emits around 495 nm (blue). Although the green-emitting phase is most widely used, the blue-emitting material shows very interesting properties in terms of persistence and perceived intensity.

Two samples with 20% by weight of active SrAlO material were prepared in the manner as described in example 1, with a pre-sintering performed at 900° C. under air and a sintering in reducing atmosphere at 1450° C. for 3 h (sample 2.1 incorporating the green-emission $SrAl_2O_4$ material and sample 2.2 incorporating the blue-emission $Sr_4Al_{14}O_{25}$ material). The results are given in the following table 1 and in FIG. 1.

TABLE 1

| sample | Pre-sintering | sintering | Colour (LAB) | Density (g · cm−3) | $Sr_xAl_yO_z$ phases ($Sr_4Al_{14}O_{25}$/$SrAl_2O_4$/$SrAl_{12}O_{19}$) | $ZrO_2$ phases (tetragonal/cubic/monoclinic) |
|---|---|---|---|---|---|---|
| 2.1 | 900° C. in air | 1450° C. in Ar/H$_2$, 3 h | 93.9/−5.9/9.2 | 5.33 | 0/18/0 | 60/21/1 |
| 2.2 | 900° C. in air | 1450° C. in Ar/H$_2$, 3 h | 95.7/−3.5/6.3 | 5.33 | 18/0/0 | 60/21/1 |

The data prove that the sample with $Sr_4Al_{14}O_{25}$ showed an emitted intensity that is 10 times higher than for the green emitting material. Although $SrAl_2O_4$ can be functionally incorporated in a zirconia matrix, it is clearly preferable to use $Sr_4Al_{14}O_{25}$.

However, the low performances of the $SrAl_2O_4$ containing samples could be due to some process steps. For example, as $SrAl_2O_4$ is water-soluble, it could be preferable not to use water-based methods for atomisation.

Example 3—Influence of $Sr_4Al_{14}O_{25}$ Grain Size and Sintering Conditions The influence of the grain size of the initial phosphor material on the obtained performances was studied for two different sintering conditions.

The images in FIG. 2 show the microstructures of the samples with standard granulometry ($D_{V10}$=1.2 µm; $D_{V50}$=2.5 µm; $D_{V90}$=6.4 µm, as in the samples 3.1 and 3.2, at left) and so-called "extrafine" granulometry ($D_{V10}$=0.1 µm; $D_{V50}$=1.4 µm, $D_{V90}$=4.7 µm, as in the samples 3.3 and 3.4, at right).

The behaviour of the four samples is displayed in table 2 and FIG. 3.

TABLE 2

| sample | Pre-sintering | sintering | Colour (LAB) | Density (g · cm$^{-3}$) | Sr$_x$Al$_y$O$_z$ phases (Sr$_4$Al$_{14}$O$_{25}$/SrAl$_2$O$_4$/ SrAl$_{12}$O$_{19}$) | ZrO$_2$ phases (tetragonal/cubic/ monoclinic) |
|---|---|---|---|---|---|---|
| 3.1 | 1475° C. in air | 1450° C. in N$_2$/H$_2$, 4 h | 94.8/−2.5/4.1 | 5.33 | 20/0/0 | 56/23/1 |
| 3.2 | 900° C. in air | 1450° C. in N$_2$/H$_2$, 3 h | 95.7/−3.5/6.3 | 5.33 | 20/0/0 | 56/23/1 |
| 3.3 | 1475° C. in air | 1450° C. in N$_2$/H$_2$, 4 h | 94.6/−2.2/3.2 | 5.35 | 18/0/0 | 60/21/1 |
| 3.4 | 900° C. in air | 1450° C. in N$_2$/H$_2$, 3 h | 95/−3/5 | 5.35 | 18/0/0 | 60/21/1 |

Although all four samples showed persistent luminescence, it is preferable in this case to use a strontium aluminate powder with standard grain size, as the samples with small powder grain size showed systematically a lower emitted intensity. Furthermore, it appears that pre-sintering at 900° C. is more favourable than at 1475° C. for the persistence. Samples with pre-sintering at 1500° C. were comparable to samples pre-sintered at 1475° C., and samples with sintering in reducing atmosphere at 1500° C. were comparable to samples sintered at 1450° C. (not shown here).

Example 4—Influence of Sr$_4$Al$_{14}$O$_{25}$ Pre-Treatment

The influence of a pre-treatment of the phosphor powder before incorporation into the zirconia slurry was studied for different sintering conditions. This pre-treatment consists in washing the powder in an aqueous acidic solution, such as, for example, a diluted solution of acetic acid (at a concentration of for instance 10% by mass) at a temperature of 70° C. for a few hours. It is known that the washing step leads to the removal of an amorphous phase from the powder preparation.

The images in FIG. 4 show the microstructures of the samples without washing (samples 3.1 and 3.2 of example 3, at left) and with an additional washing step (samples 4.1 and 4.2, at right).

The presentation in FIG. 5 summarizes the behaviour of the two types of samples, obtained each under two different conditions. In this figure, the two samples which have not been washed are the samples 3.1 and 3.2 described in the example 3.

The properties of two washed samples 4.1 and 4.2 are provided in the following table 3.

Again, all samples show persistent luminescence, but a pre-treatment of the phosphor material leads to lower emitted intensities. This effect is not fully understood and could have several origins (difference in grain size, for example).

The results also confirm that pre-sintering at 900° C. is more favourable than an initial treatment at 1475° C. for the persistence. Samples with initial treatment sintered at 1500° C. were comparable to samples heated at 1475° C., and samples with sintering in reducing atmosphere at 1500° C. were comparable to samples sintered at 1450° C.

Example 5—Effect of the Sr$_4$Al$_{14}$O$_{25}$ Concentration

The influence of the concentration of Sr$_4$Al$_{14}$O$_{25}$ in the composite material was studied, with samples comprising 20% by weight, 30% by weight and 50% by weight of phosphor material.

The results of these experiments are displayed in the FIGS. 6 and 7. In the FIG. 6, the data for the sample with 20% by weight of phosphor material correspond to the data for the sample 3.1 in example 3. In the FIG. 7 the data for the sample with 20% of phosphor material correspond to the data for the sample 3.2 in example 3.

The properties of samples 5.1 and 5.2 with 30% by weight of phosphor material and samples 5.3 and 5.4 with 50% by weight of phosphor material are provided in the following table 4.

TABLE 3

| sample | Pre-sintering | sintering | Colour (LAB) | Density (g · cm$^{-3}$) | Sr$_x$Al$_y$O$_z$ phases (Sr$_4$Al$_{14}$O$_{25}$/SrAl$_2$O$_4$/ SrAl$_{12}$O$_{19}$) | ZrO$_2$ phases (tetragonal/cubic/ monoclinic) |
|---|---|---|---|---|---|---|
| 4.1 | 1475° C. in air | 1450° C. in N$_2$/H$_2$, 4 h | 88/−1.3/1.2 | 5.38 | 19/0/0 | 60/20/1 |
| 4.2 | 900° C. in air | 1450° C. in N$_2$/H$_2$, 3 h | 94.3/−3.1/4.6 | 5.38 | 19/0/0 | 60/20/1 |

TABLE 4

| sample | Pre-sintering | sintering | Colour (LAB) | Density (g·cm$^{-3}$) | Sr$_x$Al$_y$O$_z$ phases (Sr$_4$Al$_{14}$O$_{25}$/SrAl$_2$O$_4$/ SrAl$_{12}$O$_{19}$) | ZrO$_2$ phases (tetragonal/cubic/ monoclinic) |
|---|---|---|---|---|---|---|
| 5.1 | 1475° C. in air | 1450° C. in N$_2$/H$_2$, 4 h | 96.3/−3.1/5.4 | 5.02 | 30/0/0 | 49/20/1 |
| 5.2 | 900° C. in air | 1450° C. in N$_2$/H$_2$, 3 h | 96.2/−3.9/7.4 | 5.02 | Not measured | Not measured |
| 5.3 | 1475° C. in air | 1450° C. in N$_2$/H$_2$, 4 h | 93.7/−3.1/6.3 | 4.49 | 49/0/0 | 28/16/7 |
| 5.4 | 900° C. in air | 1450° C. in N$_2$/H$_2$, 3 h | 95.5/−5.0/8.8 | 4.48 | 50/0/0 | 33/15/2 |

All samples showed persistent luminescence. A higher phosphor concentration led to a marked increase of the emitted light intensity. Again, pre-sintering at 900° C. is more favourable than an initial treatment at 1475° C. for the persistence. Samples with initial treatment sintered at 1500° C. were comparable to samples heated at 1475° C., and samples with sintering in reducing atmosphere at 1500° C. were comparable to samples sintered at 1450° C. Sintering times of 3 h, 6 h and 9 h also yielded comparable results in terms of emitted luminescence.

The elastic (Young's) modulus decreases with increasing phosphor content, from 216 GPa for pure zirconia to 182 GPa for the sample with 50 weight % phosphor. The Poisson ratio also tended to decrease with increasing phosphor content. The toughness was measured at 5.9 MPa·m$^{-0.5}$ and 3.9 MPa·m$^{-0.5}$ for 20% and 50% in weight of Sr$_4$Al$_{14}$O$_{25}$, respectively.

Finally, the FIG. 8 displays the emitted luminescence of the 20% and 50% phosphor-zirconia composites treated at 900° C. in air and then at 1450° C. in reducing atmosphere, in comparison with the emitted luminescence of a pure phosphor sample of the same type as used in example 1 and the further samples of the present application (Sr$_4$Al$_{14}$O$_{25}$ film of 160 μm thickness). Remarkably, the intensity is comparable at the outset, and is even higher after 200 minutes and more for the zirconia-phosphor sample than for the pure phosphor. This is an unexpected result and shows the tremendous potential of the approach of the inventors: a tough technical ceramic is obtained, with high tenacity and high elastic modulus, with luminescent properties that are equivalent to those of the pure phosphor powder.

It may be further noted that the measured luminescence is comparable on samples of 0.6 mm and 2 mm thicknesses.

The invention claimed is:

1. A watch component made of a persistent phosphorescent ceramic composite material which is a sintered dense body comprising at least two phases, wherein the at least two phases comprise:
   50 to 95% by weight of a first phase consisting of at least one metal oxide and
   5 to 50% by weight of a second phase consisting of a metal oxide containing at least one activating element in a reduced oxidation state, the weight proportions of said first and second phases relative to the total weight of the two phases, wherein
the watch component has a surface which comprises
   (i) a first area which shows phosphorescent emission and
   (ii) a second area
      (a) which does not show phosphorescent emission or
      (b) which shows phosphorescent emission with an intensity which is lower than that of the emission of the first area.

2. The watch component according to claim 1, wherein the metal oxide in the first phase of the persistent phosphorescent ceramic composite material is selected from the group consisting of aluminum oxide, zirconium oxide, magnesium oxide, silicon oxide, titanium oxide, barium oxide, beryllium oxide, calcium oxide and chromium oxide.

3. The watch component according to claim 1, wherein the metal oxide in the first phase of the persistent phosphorescent ceramic composite material is zirconia stabilized with a dopant selected from the group consisting of Ce, Mg and Y.

4. The watch component according to claim 1, wherein the metal oxide in the first phase of the persistent phosphorescent ceramic composite material is zirconia stabilized with yttria.

5. The watch component according to claim 1, wherein the metal oxide in the second phase of the persistent phosphorescent ceramic composite material is selected from Ca, Ba, Sr and/or Mg-aluminates, Ca, Ba, Sr and/or Mg silicates, and Ca, and/or Sr aluminosilicates.

6. The watch component according to claim 2, wherein the metal oxide in the second phase of the persistent phosphorescent ceramic composite material is selected from Ca, Ba, Sr and/or Mg-aluminates, Ca, Ba, Sr and/or Mg silicates, and Ca, and/or Sr aluminosilicates.

7. The watch component according to claim 5, wherein the metal oxide in the second phase of the persistent phosphorescent ceramic composite material is a strontium aluminate.

8. The watch component according to claim 1, wherein the amount of the first phase in the persistent phosphorescent ceramic composite material is 50 to 80% by weight and the amount of the second phase in the persistent phosphorescent ceramic composite material is 20 to 50% by weight, relative to the total weight of the two phases.

9. The watch component according to claim 2, wherein the amount of the first phase in the persistent phosphorescent ceramic composite material is 50 to 80% by weight and the amount of the second phase in the persistent phosphorescent ceramic composite material is 20 to 50% by weight, relative to the total weight of the two phases.

10. The watch component according to claim 1, wherein the area which is not phosphorescent is covered with a shielding layer.

11. The watch component according to claim 2, wherein the area which is not phosphorescent is covered with a shielding layer.

12. The watch component according to claim 10, wherein the shielding layer is made of a metallic material or of an oxide or nitride or carbide material or of a combination of the foregoing.

13. The watch component according to claim 12, wherein the metallic material is selected from the group consisting of Au, Ag, Ni, Pt, Pd or alloys of these materials.

14. The watch component according to claim 11, wherein the shielding layer is made of a metallic material or of an oxide or nitride or carbide material or of a combination of the foregoing.

15. The watch component according to claim 14, wherein the metallic material is selected from the group consisting of Au, Ag, Ni, Pt, Pd or alloys of these materials.

16. A watch component made of a persistent phosphorescent ceramic composite material which is a sintered dense body comprising at least two phases, wherein the at least two phases comprise:
   50 to 95% by weight of a first phase comprising at least one metal oxide selected from the group consisting of aluminum oxide, zirconium oxide, magnesium oxide, silicon oxide, titanium oxide, barium oxide, beryllium oxide, calcium oxide and chromium oxide and
   5 to 50% by weight of a second phase comprising of a metal oxide containing at least one activating element in a reduced oxidation state, the metal oxides selected from Ca, Ba, Sr and/or Mg-aluminates, Ca, Ba, Sr and/or Mg silicates, and Ca, and/or Sr aluminosilicates;
   the weight proportions of said first and second phases relative to the total weight of the two phases, wherein the watch component has a surface which comprises
   (i) a first area which shows phosphorescent emission and
   (ii) a second area
      (a) which does not show phosphorescent emission or
      (b) which shows phosphorescent emission with an intensity which is lower than that of the emission of the first area.

17. The watch component of claim 16, wherein the second area does not show phosphorescent emission, and wherein said second area is covered with a shielding layer, said shielding layer being made of a metallic material or of an oxide or nitride or carbide material or of a combination of the foregoing, wherein the wherein the metallic material is selected from the group consisting of Au, Ag, Ni, Pt, Pd or alloys thereof.

18. A watch component made of a persistent phosphorescent ceramic composite material which is a sintered dense body comprising at least two phases, wherein the at least two phases comprise:
   50 to 95% by weight of a first phase comprising a zirconium oxide, and
   5 to 50% by weight of a second phase comprising a strontium aluminate,
   the weight proportions of said first and second phases relative to the total weight of the two phases, wherein the watch component has a surface which comprises
   (i) a first area which shows phosphorescent emission and
   (ii) a second area
      (a) which does not show phosphorescent emission or
      (b) which shows phosphorescent emission with an intensity which is lower than that of the emission of the first area.

19. The watch component of claim 18, wherein the strontium aluminate is selected from the group consisting of $SrAl_2O_4$, $SrAl_4O_7$, $SrAl_{12}O_{19}$ and $Sr_4Al_{14}O_{25}$.

20. The watch component of claim 19, wherein the second area does not show phosphorescent emission, and wherein said second area is covered with a shielding layer, said shielding layer being made of a metallic material or of an oxide or nitride or carbide material or of a combination of the foregoing, wherein the wherein the metallic material is selected from the group consisting of Au, Ag, Ni, Pt, Pd or alloys thereof.

* * * * *